US011265209B2

(12) United States Patent
Naga et al.

(10) Patent No.: US 11,265,209 B2
(45) Date of Patent: Mar. 1, 2022

(54) SYSTEM AND METHOD FOR DYNAMIC AND EXTENSIBLE MANAGEMENT OF DEVICE NODES

(71) Applicant: Dell Products L.P., Round Rock, TX (US)

(72) Inventors: Vijayasimha Reddy Naga, Georgetown, TX (US); Prakash Nara, Round Rock, TX (US); Sudhir Vittal Shetty, Cedar Park, TX (US); Kathleen A. Hattaway, Austin, TX (US); Dahir Nur Herzi, Round Rock, TX (US); Madhav Karri, Austin, TX (US); Venkata Bala Koteswararao Donepudi, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/570,350

(22) Filed: Sep. 13, 2019

(65) Prior Publication Data
US 2020/0007389 A1 Jan. 2, 2020

Related U.S. Application Data

(63) Continuation of application No. 15/594,301, filed on May 12, 2017, now Pat. No. 10,491,465.

(51) Int. Cl.
*H04L 12/24* (2006.01)
*H04L 29/08* (2006.01)
(Continued)

(52) U.S. Cl.
CPC .......... *H04L 41/0803* (2013.01); *H04L 67/34* (2013.01); *H04L 41/0853* (2013.01); *H04L 63/08* (2013.01)

(58) Field of Classification Search
CPC . H04L 41/0803; H04L 41/0853; H04L 63/08; H04L 63/34
See application file for complete search history.

(56) References Cited

U.S. PATENT DOCUMENTS

| 6,205,465 B1 | 3/2001 | Schoening et al. |
| 6,226,788 B1 | 5/2001 | Schoening et al. |
| (Continued) | | |

FOREIGN PATENT DOCUMENTS

CN 101051962 A 10/2007

*Primary Examiner* — Thomas J Dailey
(74) *Attorney, Agent, or Firm* — Jackson Walker LLP; Christopher J. Rourk

(57) ABSTRACT

A device management system that receives a first service request message for a remote device node, the request including an address identifier and a connection profile identifier. The system retrieves from a database protocol configuration information associated with the service request. The system connects to the remote device using the protocol configuration information and iterates through device packs and identifies a device type and support for in-band and out-of band application protocols for the remote device. The system retrieves and stores the retrieved device type and in-band and out-of band application protocols. The system further receives a second service request message that includes a device identifier of the remote device and iteratively connect to the remote device associated with the device identifier using each of the in-band and out-of band application protocols and retrieves an inventory of management operations associated with each application protocol.

18 Claims, 9 Drawing Sheets

(51) Int. Cl.
  *H04L 29/06*      (2006.01)
  *H04L 41/0803*    (2022.01)
  *H04L 67/00*      (2022.01)
  *H04L 41/0853*    (2022.01)

(56) References Cited

U.S. PATENT DOCUMENTS

| | | |
|---|---|---|
| 6,505,228 B1 | 1/2003 | Schoening et al. |
| 7,716,315 B2 * | 5/2010 | Sullivan ................. G06F 16/10 |
| | | 709/223 |
| 8,214,473 B1 * | 7/2012 | Wexler ................. G06F 9/4411 |
| | | 709/223 |
| 8,560,713 B2 * | 10/2013 | Moreira Sa de Souza ................. |
| | | H04L 67/28 |
| | | 709/230 |
| 9,077,611 B2 * | 7/2015 | Cordray .............. H04L 41/0856 |
| 9,130,903 B2 * | 9/2015 | Ryman ................. H04L 67/025 |
| 10,163,137 B2 | 12/2018 | Hoffberg |
| 10,230,588 B2 | 3/2019 | Cordray et al. |
| 2003/0200288 A1 | 10/2003 | Thiyagarajan et al. |
| 2009/0287837 A1 | 11/2009 | Felsher |
| 2013/0159021 A1 | 6/2013 | Felsher |
| 2017/0290074 A1 * | 10/2017 | Lee .................... H04L 61/6022 |

\* cited by examiner

SYSTEM AND METHOD FOR DYNAMIC AND EXTENSIBLE MANAGEMENT OF DEVICE NODES

CROSS-REFERENCE TO RELATED APPLICATIONS

The present application is a continuation of U.S. patent application Ser. No. 15/594,301 filed May 12, 2017, which is hereby incorporated by reference for all purposes as if set forth herein in its entirety.

TECHNICAL FIELD

The present disclosure relates generally to managed network systems and, in particular, to methods and systems for dynamic and extensible management of device nodes communicating with management applications over different types of communication protocols in a managed network system.

BACKGROUND

The monitoring and management of device nodes in network infrastructure is critical. Maintaining a near one hundred percent system uptime and near peak performance so that services are not disrupted or otherwise perform inadequately is expected of most service providers today. In addition, device nodes and their system architectures are becoming more advanced and complex, e.g. hardware virtualization and software virtualization used in cloud computing environments, and the use of these architectures is becoming more sophisticated and prone to error. The added complexity and sophistication necessitates more sophisticated ways of monitoring and managing these systems.

SUMMARY

Techniques herein provide a computer-implemented system and method to manage device nodes in a network infrastructure. The system discovers remote nodes to be managed, and in the process of discovering, determines from those nodes in-band and out-of band monitoring and management applications that are supported, and updates a database to reflect the applications that are supported. The system further performs an inventory of the remote node using each of the applications discovered. Additionally, the system is capable of utilizing newly discovered applications and inventoried capabilities to perform operational functions on the remote node.

In one aspect, the system includes a storage resource and a processor communicatively coupled together that includes executable application code instructions that cause the processor to manage and monitor the remote nodes. The system receives a first discovery service request message that includes connection identifying information for a remote device node and retrieves from a database protocol configuration information associated with the service request. The system connects to the remote device using the protocol configuration information and iterates through device packs and identifies therefrom a device type and support for in-band and out-of band application protocols. The system then determines the device type and identified in-band and out-of band application protocol based on the device pack that worked and locally stores in-band and out-band application protocols identifiers according to the identified device type. The system further receives a second service request message that includes a device identifier of the remote device and iteratively connects to the remote device associated with the device identifier using in-band and out-of band application protocols identified by the identifiers, i.e. the device type identifiers, remote management application identifiers, and protocol identifiers, and retrieves an inventory of supported management operations associated with each application protocol.

In another aspect, the system is operational to receive a third service request message that includes the device identifier and an operation identifier and, in response, retrieve device type and endpoint information pursuant to the third service request. The system is operational to further select from the database by the device type an application protocol according to the operation identifier and select operation commands according to the operation identifier and send to the remote device the operation commands. The operational commands when processed causing the remote device to perform actions defined by the commands.

DETAILED DESCRIPTION OF THE EXAMPLE EMBODIMENTS

Figure 1:
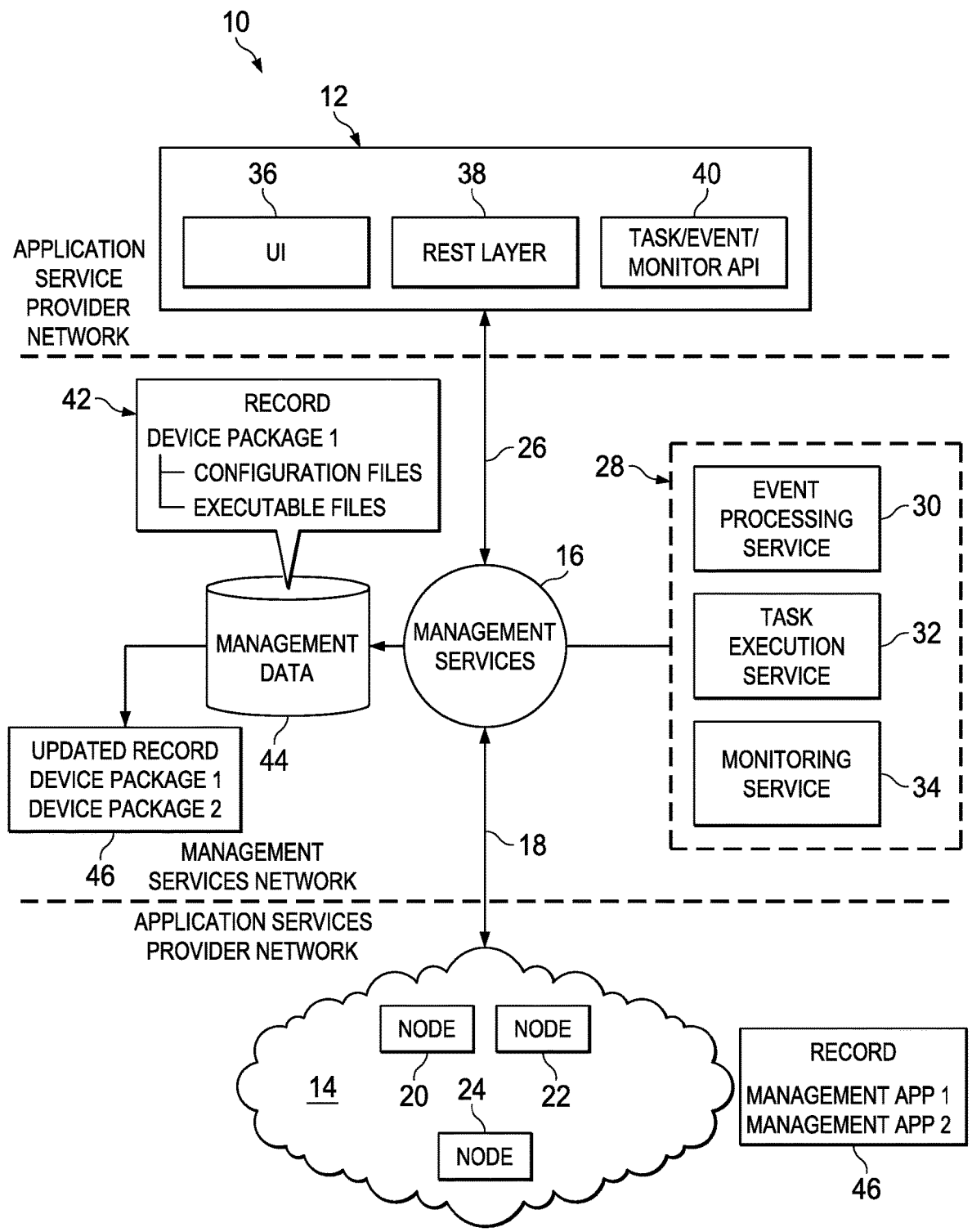
FIG. 1 is a network infrastructure illustration incorporating the use of a device management system, in accordance with certain example embodiments.

The capabilities to monitor and manage device nodes in network infrastructure platforms must evolve to become more sophisticated. In these managed networked systems, device nodes in a systems infrastructure can be monitored and managed using commercially available application tools. For example, applications that operate out-of band, i.e. independent of a devices installed operating system, include Bios Management System (BMS), integrated Dell Remote Access Controller (iDRAC), and REST based Redfish and applications that operate in-band can include Internet Control Protocol Message (ICMP) and Simple Network Management Protocol (SNMP) or other similar tools that can harvest kernel and system logging facilities and report issues. These tools can provide monitoring and management of anything from a device's CPU to various kernel and system parametric values. Network nodes used to build out a network infrastructure can include some of these tools, e.g. a network storage appliance can include iDrac for out-of band monitoring management and ICMP for in-band management whereas a chassis server or tower server can include support for iDrac and Redfish for out-of band support as well as ICMP and SNMP for in-band support. The configuration is often determined by the specific product manufactured and sold, e.g. a chassis style server and a network switch can have separate and distinct needs as far as monitoring and management is concerned.

A business model found in use today is one where a network infrastructure and nodes therein can be monitored and managed by a first party and application development and services are provided by another party. The application service provider and the organization managing and monitoring the infrastructure can be one in the same. Regardless, the monitoring and management facilities can be used to periodically perform a discovery and inventory process on the device nodes in the infrastructure in order to catalogue the monitoring and management service capabilities available per node and per system. Once this information is collected, network nodes within the infrastructure can be monitored and managed accordingly. Often the functional capabilities of how these devices can be managed are defined by a service pack pre-installed on the device itself during manufacture. A problem that exist with this current arrangement is that a single management application installed during manufacture defines how the devices are discovered and inventoried. However, during the lifecycle of the device, the system configuration itself can change, i.e. new management applications added. In this case, management and monitoring capabilities of the device can also change and without full knowledge of this the monitoring and management facilities ability to fully discover and collect inventory and perform subsequent tasks utilizing the full capabilities of the monitored device also would be effected.

The present disclosure provides a monitoring and management facility that dynamically adapts to the dynamics of the infrastructure being monitored.

The described technology comprises a network application communications platform for managing remotely network nodes in a network infrastructure using a discovery process and an inventory process where a device type and device data of a remote node is discovered and synchronized between the management system and remote node and capabilities of the remote node are determined based on the discovery of the aforementioned information. In addition, once the device type and capabilities of the node are discovered, management operation of the device can be performed using the discovered capabilities.

The motivation for operating such a system is so that updates to the system being monitored can be reflected on the side of the system where the monitoring is being done. Without such updates, the monitoring system may not have the full capabilities of the managed node or nodes and, therefore, cannot fully manage the remote nodes to their full capabilities. In addition, in the case of cloud services where virtual nodes are continuously being added and the specific architectural structures of the nodes are changing, the provisioning of this information or the changes thereto to the managing system is important.

In an example embodiment, the management system can automatically perform scheduled maintenance on a remote system or, alternatively, direct commands indicating a specific operation can be issued from a services provider to the party monitoring the remote nodes. In the event the operation requested is a discovery and inventory process, the system managing the remote nodes can initiate the operations necessary to interact with the remote node based on information provided and discover information about the remote node that was previously unknown. For example, the remote node could originally have been configured to use iDRAC for out-of band monitoring and in-band monitoring and managing capabilities of SNMP. After discovery, the configuration may now include out-of band capabilities for iDRAC and Redfish and in-band capabilities for SNMP and ICMP. Now that the information is discovered, the inventory process can be executed and the full capabilities of the remote node can be determined. The information now provided to the managing system can be used in operational processing, such as monitoring, retrieving information, or otherwise causing the remote node to perform certain functions, in a more productive manner.

Referring now to the drawings, in which like numerals represent like (but not necessarily identical) elements in the different figures, example embodiments are described in detail.

FIG. 1 is a network architecture according to an embodiment of the device management system and is denoted generally as 10. In an example embodiment, system architecture 10 includes an application services provider network 12, 14 and a management services network 16 communicable coupled with application service provider network 12, 14. In this example, management services network 16 can be a $3^{rd}$ party services provider providing network node monitoring and management services as a customer service, although the whole system could be operated by the same entity or used in other suitable embodiments. Management services network 16 includes system interface 18 and associated system logic that allows for the monitoring and management of network nodes 20, 22, and 24. Management services network 16 further includes interface 26 and associated system logic that allows for providing or allows for access to a service module 28 that includes an event process service 30, a task execution service 32, and monitoring service 34. Service module 28 can be accessible by provider network 12 using a traditional UI, e.g. http/html access to executable services, 36 or using a REST layer 38. In either case, a task, event, or monitoring API 40 can be used to access service module processes. System architecture 10 can be implemented in hardware or a suitable combination of hardware and software, and can be one or more hardware systems operating under control of one or more software systems. Management services network 16 under direction of the application service provider can discover remote nodes in service provider network 14 and perform an inventory of the system architecture of those nodes. This inventory or the accurateness of this inventory is important so that the full capability of the management operations for a device node are available. An issue previously discussed and being addressed is the fact that during the normal life cycle of network infrastructure the network can grow and the system architectures of the device nodes can be upgraded and, therefore, device packs will reflect these upgrades. For example, management services network 16 can have record 42 persisted to management services database 44 wherein the record shows that for node 20 device pack 1 is installed. Although, it should be understood that initially no device packs for a remote node need be stored. Device packs define configuration files and executables installed on a node. However, the current record 46 stored on node 20 can reflect that management application 1 and 2 are installed on node 20, reflecting an upgrade. During the discovery process, management services network 16 can retrieve information from node 20 that indicates the update and make changes to management services database 44 so that an updated record 46 can be persisted to the database. As the device packs indicate monitoring and management capabilities of a node, the inventory procedures and management operations can be performed using those enhancements, e.g. if device service pack only allowed for the use of ICMP in monitoring kernel activity but a subsequent upgrade allowed for the use of SNMP as well, the additional application service can be used to enhance monitoring and management capabilities.

Figure 2:
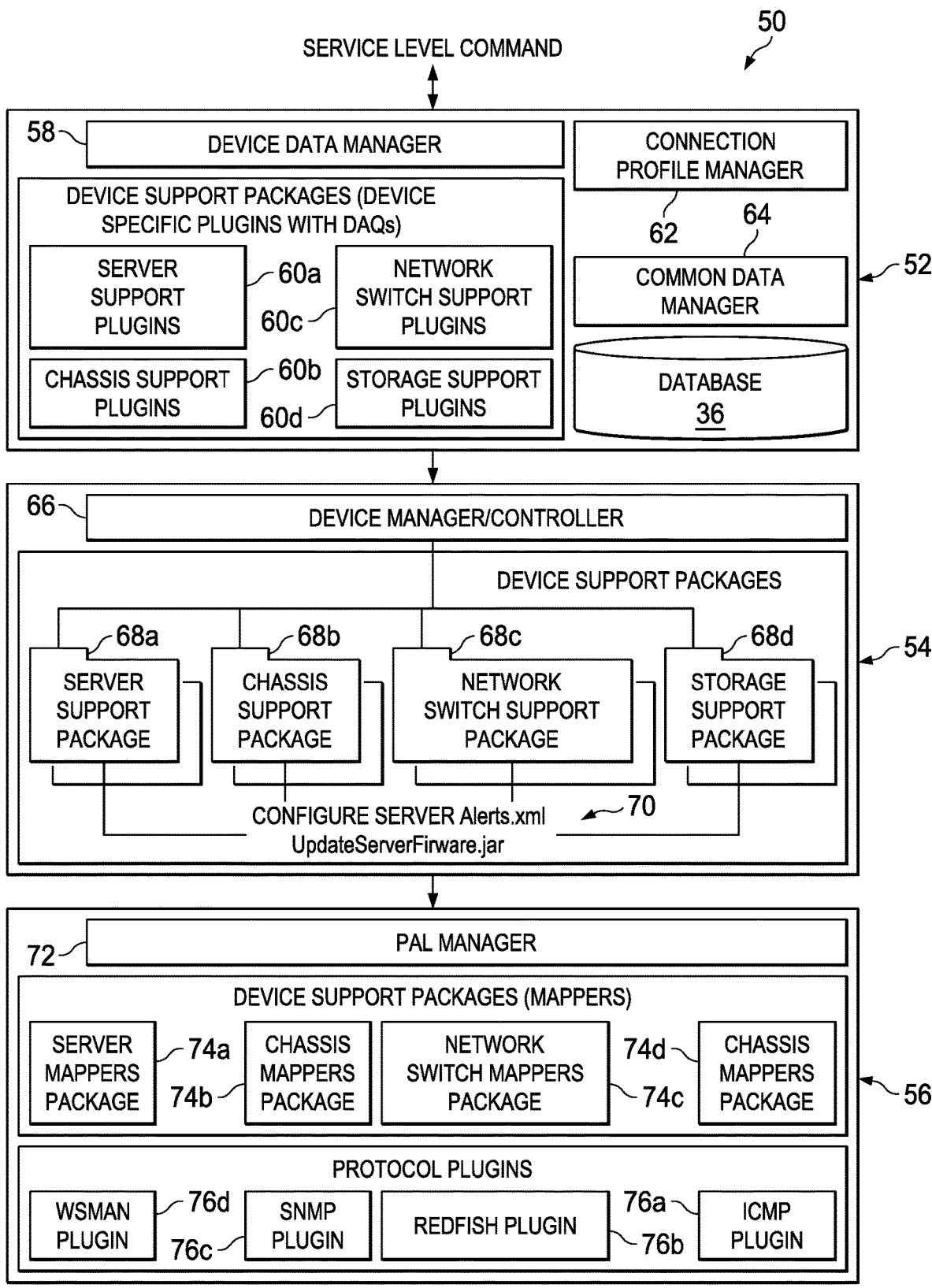
FIG. 2 is a block diagram illustration of a device management system, in accordance with certain example embodiments.

FIG. 2 is a block diagram of logical component parts of MGMT services 16 and application services layer 12 denoted generally as 50. MGMT services 16 includes a business layer 52, a device management layer 54, and a Protocol Abstraction Layer (PAL) 56. The business layer 52 includes a device data manager 58, database 36, a support plugin identifiers 60a-d per device type, a connection profile 62, and a common data manager 64. Device management layer 54 includes a device manager 66, support packages 68a-d per device type, and at least one instruction set 70 per device type, either an xml schema file or jar file, for each supported package. PAL 56 includes a PAL Manager 72, support packages mapper 74a-d, e.g. a server, a chassis, a network switch, and storage mapper, and protocol plugins 76a-d, e.g. WSMAN, SNMP, Redfish, and ICMP plugin. For example, the instructions provided by the instruction set can be suitable functional features of one of the defined application protocols, e.g. report on CPU utilization or memory utilization. Alternatively, the instruction set in the case of a jar file could be custom defined that install execute new functional capabilities the java runtime execution environment.

In a use case, device data manager 58 receives a service level command, e.g. from task execution service 30, to initiate a discovery service for a device or devices within a network having a certain IP address or addresses or having association with a certain IP address or range and connection profile id. Device data manager 58 sends a request with the connection profile id to connection profile manager 62. Profile manager 62 then retrieves protocol configuration information from database 36. Protocol configuration information can include information such as security certificates, usernames, passwords, and other communication attributes necessary to establish a secure connection with an endpoint. A discovery request that includes the IP address and protocol configuration is then sent to device manager 66 and PAL manager 72. The PAL manager 72 attempts to connect using each protocol configuration 76a-d so that a successful connection and performance of the commands, i.e. actions, results in the identification of a device within the network and information useful for further operations and actions. The remote device upon successful execution of the actions returns a device type and device data that can be used to determine the service packs installed and, therefore, the application protocol plugins. The application protocol plugins supported and evaluated successfully as well as the device type and information are persisted to the database.

In another user case, data manager 58 receives a service level command, e.g. from task execution service 30, to perform an action such as to configure alerts on a remote device or install a firmware update. Based on the request, the device type and address information of the node is retrieved and if it is determined that the requested operation requires a specific plugin or plugins, i.e. application protocol, the database is queried for the plugin identifier or identifiers associated with the device type. The action requested, device type, address information, and plugin identifier or identifiers are then passed to the device manager 54 and PAL 56 for formatting and configuring the necessary communications to use over the selected plugin. At this point, the device manager 54 can either query for a data file or executable, e.g. configserveralerts.xml or updateserverfirmware.jar 70, associated with the device type and action requested. The data file or executable is interpreted to make network protocol invocations to get and set information. The executable contains logic that orchestrates the network protocol invocations.

Figure 3:
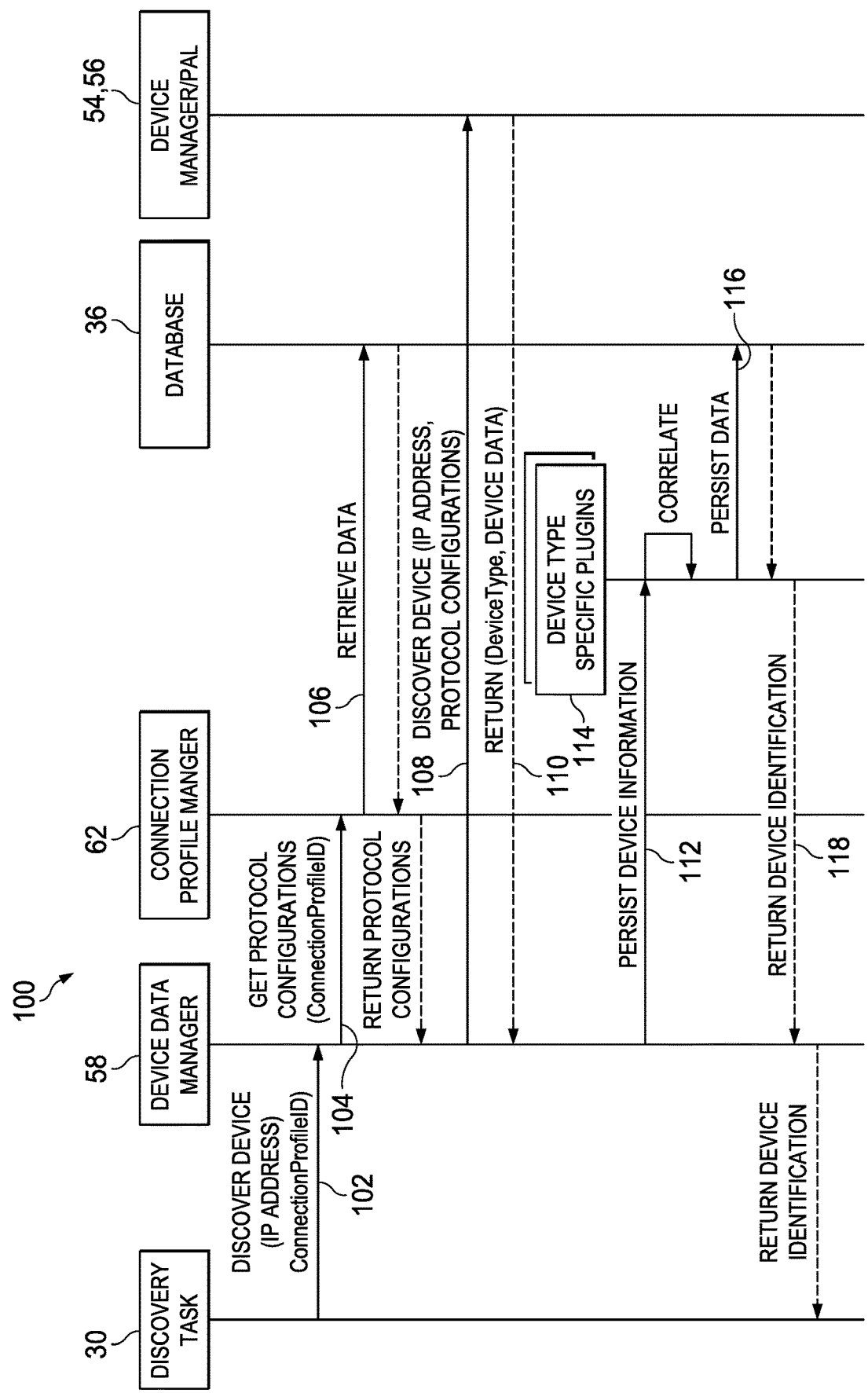
FIG. 3 is a signaling diagram illustration of a device management system for executing a discovery process, in accordance with certain example embodiments.

FIG. 3 is a device discovery signaling and process algorithm denoted generally as 100. Algorithm 100 can be implemented in hardware or a suitable combination of hardware and software, such as using one or more software systems operating on MGMT services 16 components: device data manager 58; connection profile manager 62; database 36; and device manager/PAL 54, 56 coupled with and receiving commands from task execution services 30. Task execution service 30 sends a discover device message 102 that includes the IP address and a connection profile identifier to device data manager 58. Connection profile identifier can include host and domain name, public encryption keys, username, and password sets for different infrastructure components, although most of this information does not need to be provided if it has already been persisted to the database. Device data manager 58 in return sends a request 104 for protocol configuration information and connection information to connection profile manager 62. Connection profile manager 62 sends a request 116 to database 36 and database 108 returns protocol configuration information. The protocol configuration information can include the public encryption keys, usernames, and passwords. Device data manager 58 can then send a discover device request 108 that includes the device IP address and protocol configuration to device manager/PAL 54, 56. Device manager 54 and PAL 56 can then attempt to establish a connection with a remote device, e.g. ICMP plugin 76a, Redfish plugin 76b, SNMP plugin 76c, or WSMAN plugin 76d. Connection request message 110 is sent to a remote device, e.g. node 20, to establish a session with the remote device. Once a connection and session are established, discovery operations can be performed in order to obtain device type and device data, such as a service tag that identifies a device pack and other endpoint details, at step 110. Device data manager 58 can send a persist command 112 to a device type plugin routine 114. Routine 114 can then catalogue the information according to device type and subsequently persist the data 116 to database 36. In response, database 36 sends a return message 118 that includes a device id to the device data manager 58 and the data manager 58 sends the identifier to the services layer 30.

Figure 4:
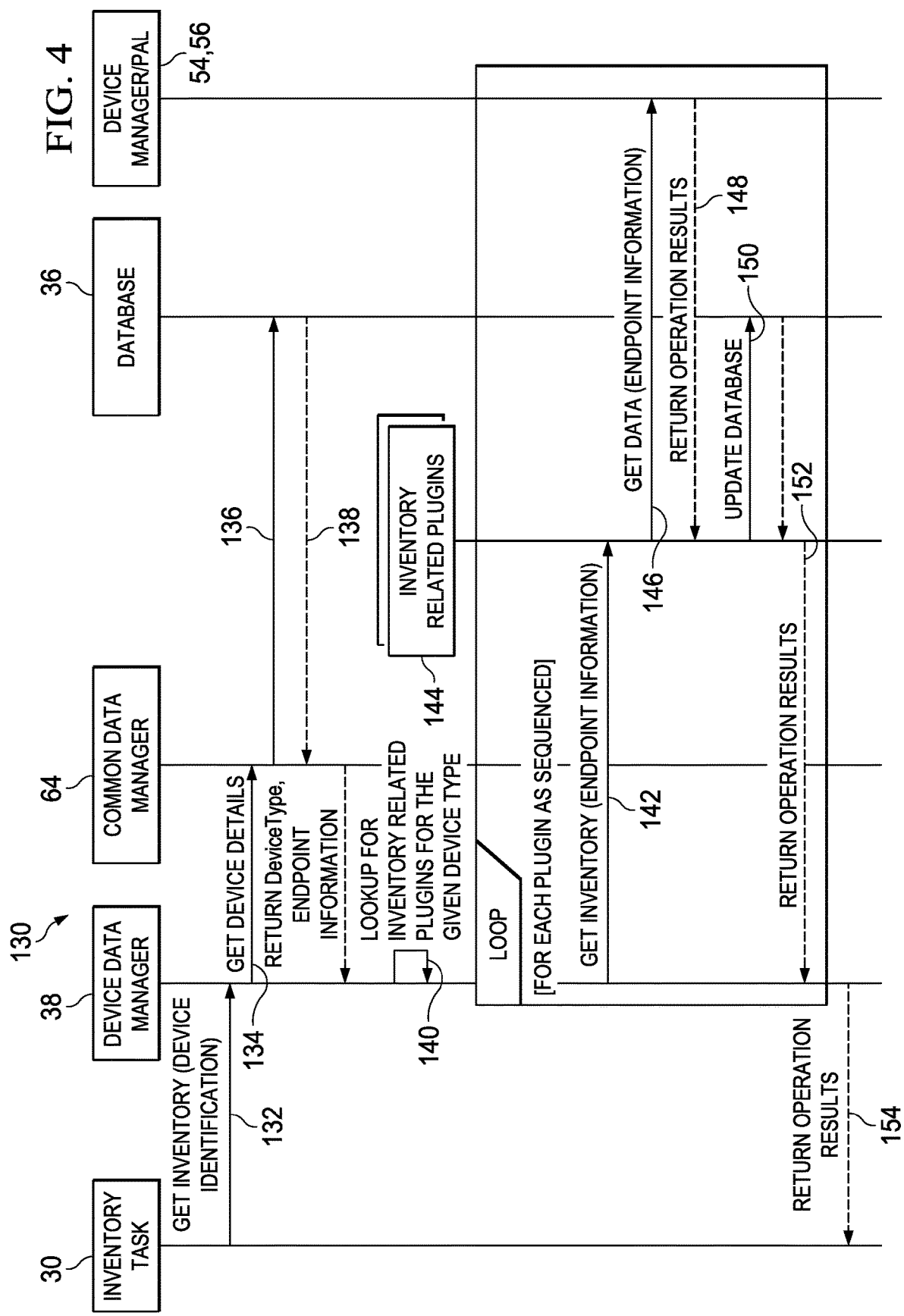
FIG. 4 is a signaling diagram illustration of a device management system for executing an inventory process, in accordance with certain example embodiments.

FIG. 4 is an inventory discovery signaling algorithm according to an embodiment of the MGMT services 16 denoted generally as algorithm 130. Algorithm 130 can be implemented in hardware or a suitable combination of hardware and software, such as using one or more software systems operating on MGMT services 16 and its components. Algorithm 130 includes MGMT services 16 and component's device data manager 58, connection profile manager 62, database 36, and device manager/PAL 56 coupled with and receiving commands from task execution service 30. Service 30 sends a get inventory message 132 to device data manager 58. Data manager 58, in response, sends a get device details command 134 to common data manager 64. Common data manager 64 sends a database query message 136 to database 36 requesting endpoint information. An endpoint response message 138 that includes endpoint address information and a device type is returned to the device data manager. Device data manager 58 then performs a loop procedure 140 wherein storage, such as a file system, is queried per the device type to determine all related plugins, i.e. application protocols, associated with the endpoint information. Device data manager 58 sends a get inventory command 142 that includes identifying endpoint information to an inventory related routine 146 that in return sends a get data command 144 to device manager/PAL 54, 56. This process is repeated for each plugin. Device manager/PAL 54, 56 returns an operation results command 148 that includes the inventory results for the particular node. The database is updated with update query 150. Device data manager 58 receives an operation results command 152 and services 30 receives operation results message 154.

Figure 5:
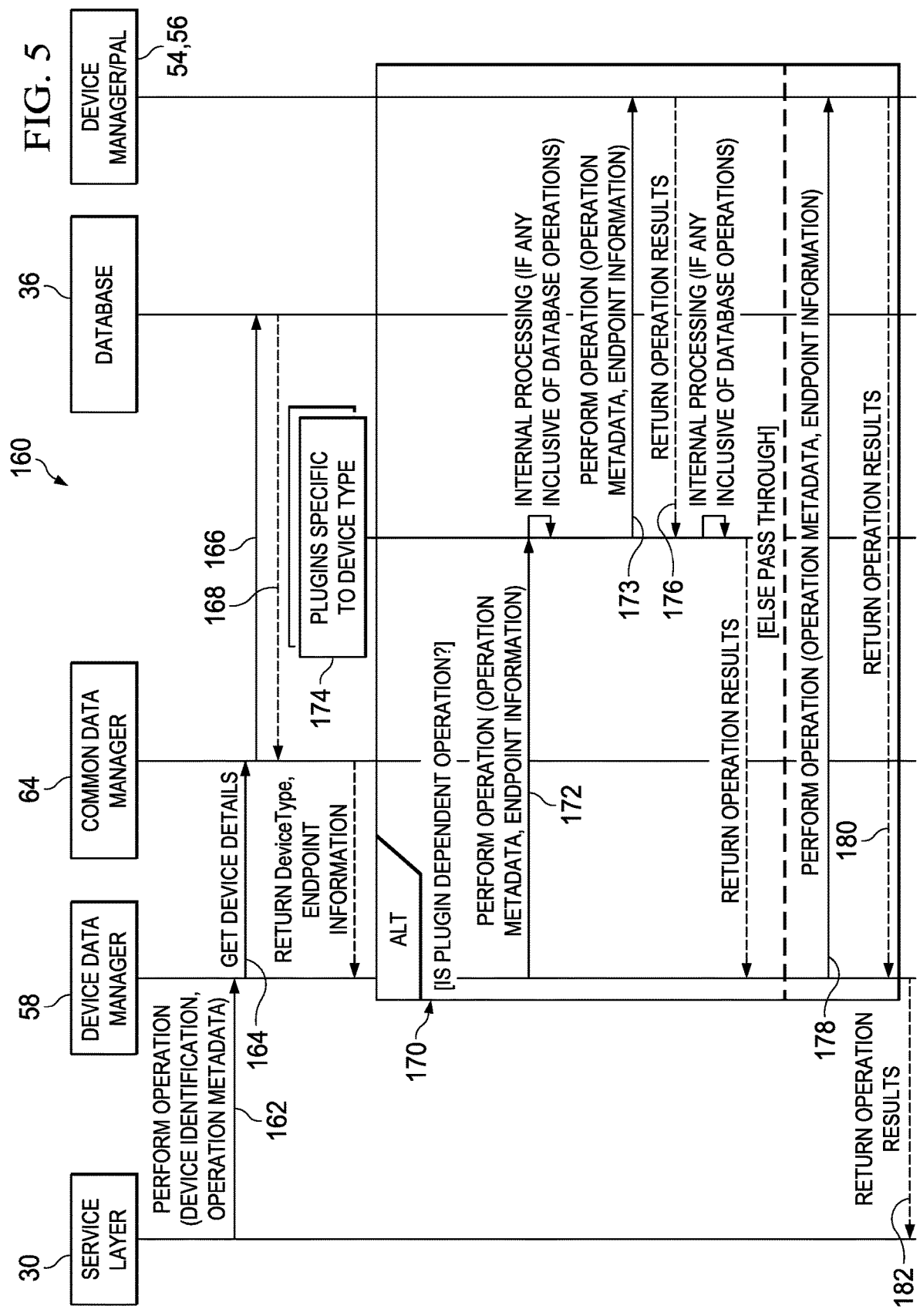
FIG. 5 is a signaling diagram illustration of a device management system for executing an operational action on a remote device, in accordance with certain example embodiments.

FIG. 5 is an operation signaling algorithm according to an embodiment of the MGMT services 16 denoted generally as algorithm 160. Algorithm 160 can be implemented in hardware or a suitable combination of hardware and software, such as using one or more software systems operating on MGMT services 16 and its components. Algorithm 160 includes device data manager 58, common data manager 64, database 36, and device manager/PAL 56 of MGMT services 16 coupled with and receiving commands from task execution service layer 30. Service layer 30 sends a perform operation message 162 that includes operation metadata and a device identifier to device data manager 58 and data manager 58 in return sends a get device command 164 to common data manager 64. Common data manager 64 in return formats and sends a database query 166 to database 64 and database 36 in returns responds 168 with device type and endpoint information associated with the device identifier. Device data manager performs an if-then-else routine 170 with the returned information. Device data manager 58 determines if there is a specific plugin required for the specific device operation. Data manager 58 sends a query command 172 to plugin routine 174 where it is determined if a specific plugin is required. If it is determined that a plugin is required for the operation, a perform operation command 173 is implemented that causes the operation metadata, endpoint information, and plugin identifier to be sent to the device manager/Pal 54, 56 whereupon completion of execution the results are returned in an operation results command 176. Alternatively, if the operation is not plugin dependent, a perform operation command 178 with operation metadata and endpoint information are sent to device manager/PAL 54, 56. In this case, operation results are also provided in return command 180 and message 182.

Figure 6:
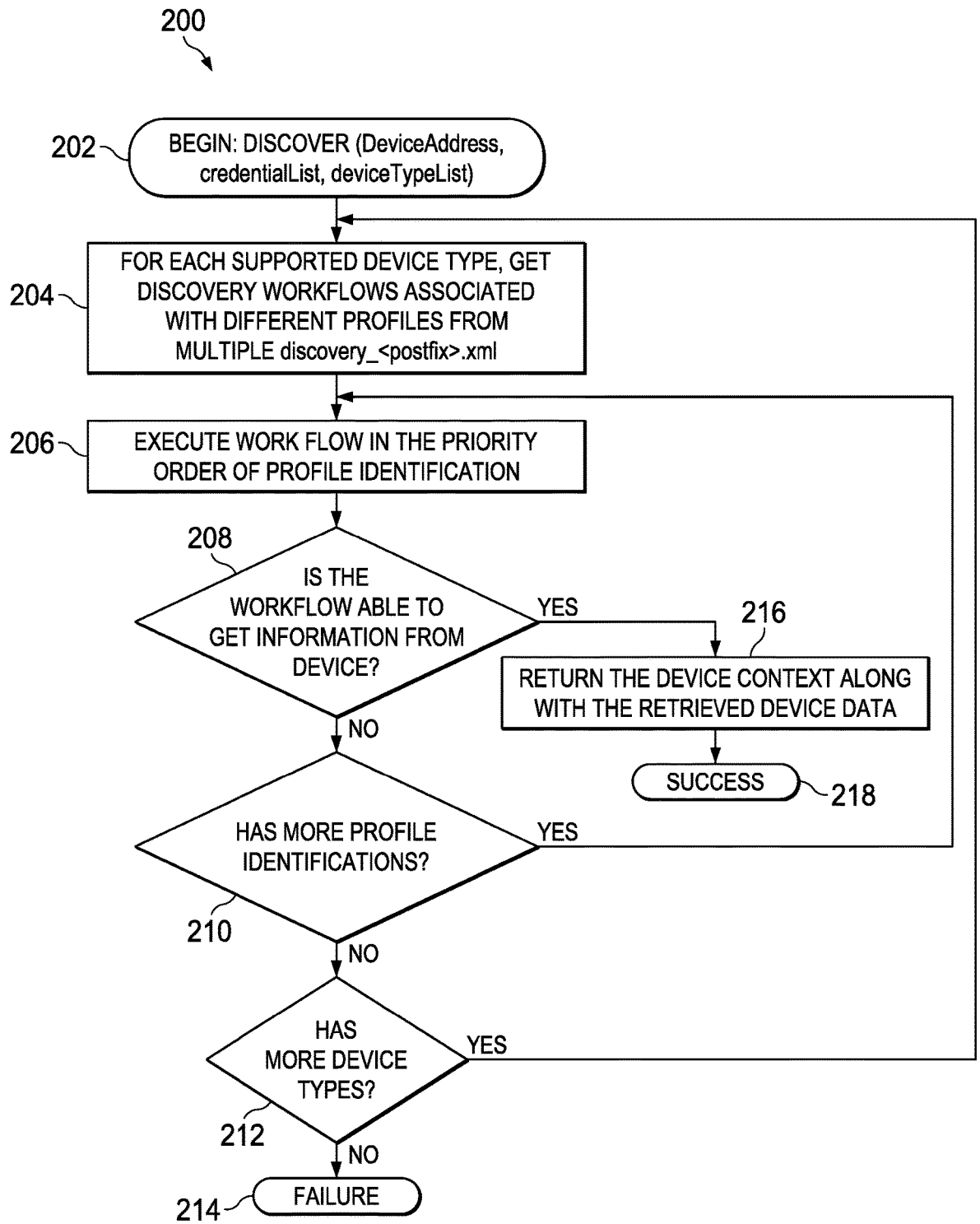
FIG. 6 is a process flow diagram for the discovery process for management services, in accordance with certain example embodiments.

FIG. 6 is a process flow algorithm for the discovery process for MGMT services 16 denoted generally as algorithm 200. Algorithm 200 can be implemented in hardware or a suitable combination of hardware and software, such as using one or more software systems operating on MGMT services 16 and its components. At step 202, the algorithm begins when a command is received that includes the address of a remote device, a credentials list, and a device type list. For each supported device type, discovery work flows associated with different profile identifiers, i.e. supported application protocols, are retrieved from database 36, step 204. Next, step 206, the retrieved work flows are executed in a priority order associated with the profile identifier. The algorithm then continues and determines if the workflow is able to get information from the remote device at step 208 If not, it is further determined whether the device type has more profile identifiers at step 210. If not, it is determined whether there are more device types at step 212. If not, a failure is returned at step 214. However, if it is determined more profile identifiers exist at step 210, the workflow for the application protocol for that profile identifier is executed at step 206. Additionally, if determined at step 212 that the device has more device types, the process returns to step 204. If at step 208, the workflow is able to get information from the device, the device type along with the retrieved device data are returned at steps 216 and 218.

Figure 7:
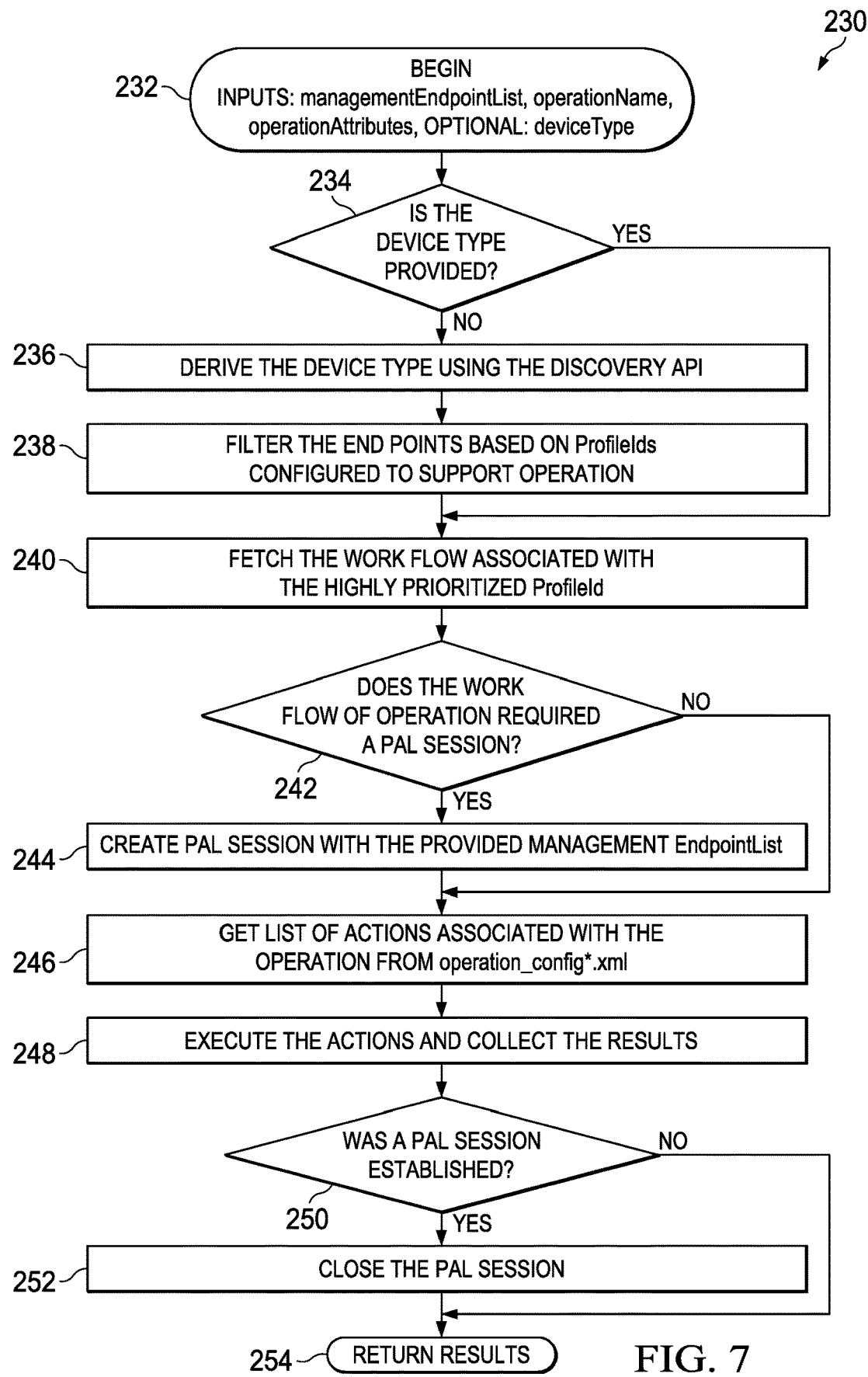
FIG. 7 is a process flow diagram for the operation processing for management services, in accordance with certain example embodiments.

FIG. 7 is a process flow algorithm for operations processing for MGMT services 16 denoted generally as algorithm 230. Algorithm 230 can be implemented in hardware or a suitable combination of hardware and software, such as using one or more software systems operating on MGMT services 16 and its components. Algorithm 230 begins at step 232 where the management endpoint list, operations name, operation attributes, and, optionally, device type are received. Algorithm 230 then determines whether the device type has been provided at step 234. If the device type is not provided, the device type is determined using the discovery API at step 236. The algorithm then filters the endpoints, e.g. IP address information, according to the profile identifier associated with the device type capable of supporting the operation at step 238. If the device type is provided or subsequently provided, the work flow, i.e. process actions, associated with the highest prioritized identifier is fetched, step 240. Next, step 242, it is determined if the work flow of the operations requires a PAL session, step 242. If so, the PAL session is created with the remote device using the endpoint list, step 244. If a PAL session is created or one is not required, as determined in step 242, the list of actions, i.e. workflows, associated with the operation are retrieved, step 246. Next, step 248, the algorithm executes the actions and collects the results. Followed by determining if a PAL session was established, step 250, and if so, closing the PAL session, step 252, and returning the results, step 254.

Figure 8:
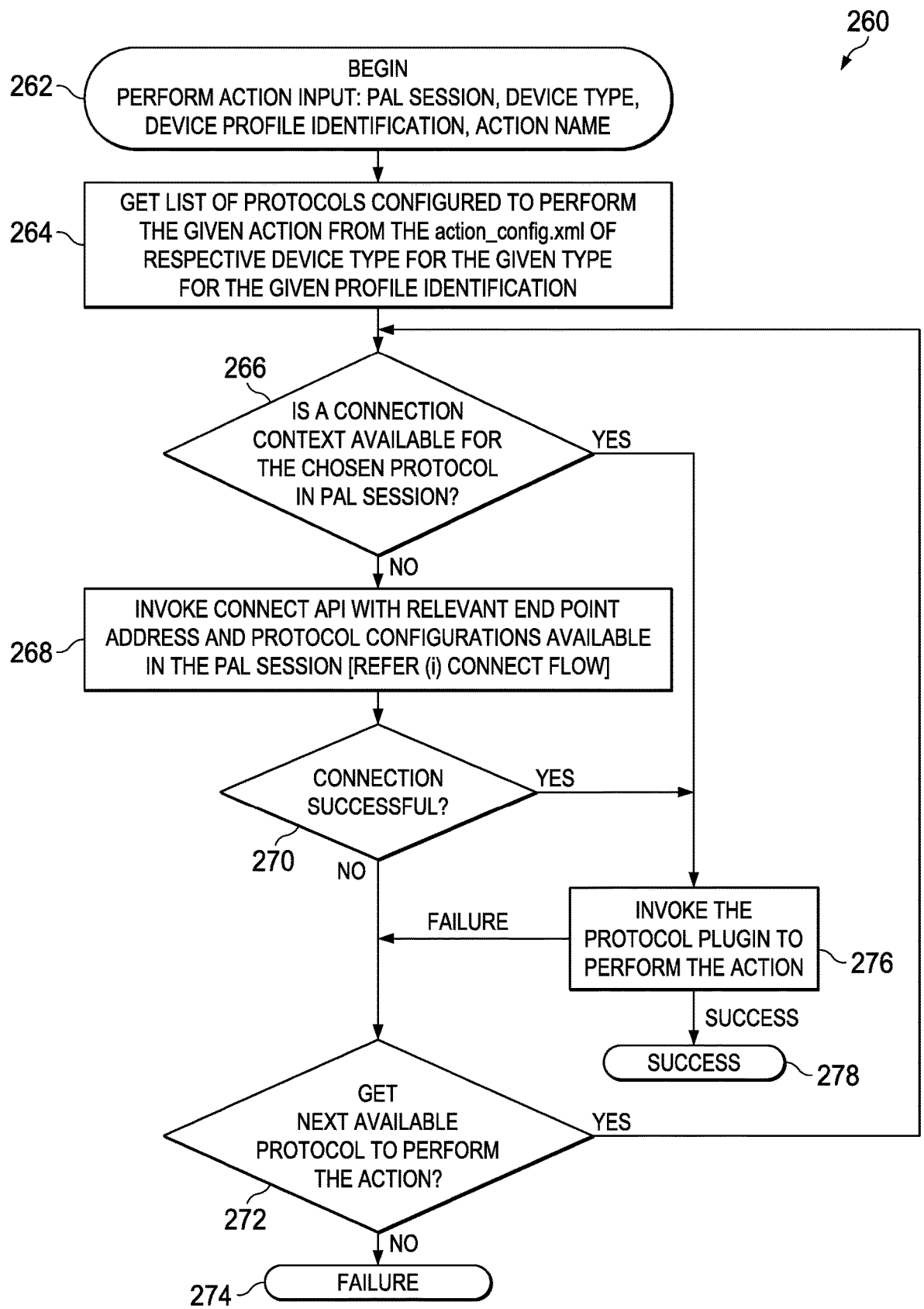
FIG. 8 is a flow diagram for selecting a plugin in performing an action for managed service network, in accordance with certain example embodiments.

FIG. 8 is a flow diagram algorithm for selecting a plugin in performing an action denoted generally as algorithm 260. Algorithm 260 can be implemented in hardware or a suitable combination of hardware and software, such as using one or more software systems operating on MGMT services 16 and its components. Algorithm 260 begins at step 262 when a perform action that includes a PAL session, device type, device profile id and action name is received. Next, step 264, a list of application protocols able to and configurable to perform the process action for the device type and profile identifier is retrieved from an associated file or database 36. Next, at step 266, it is determined if a connection context is available for the chosen protocol in PAL session. If not, the connect API is invoked with relevant end point address and protocol configurations available in the PAL session, step 268. At step 270, it is determined if the connection was successful. If the connection is not successful, the next available application protocol identified form the aforementioned filed or database 36 able to perform the action is determined, step 272. If there is no available application protocol, a failure response is returned, step 274. If an application protocol is available, the algorithm returns to step 266. If a connection is available, as determined at step 266 or a connection attempt was successful, step 270, the plugin is invoked to perform the action, step 276, and response of success is returned.

Figure 9:
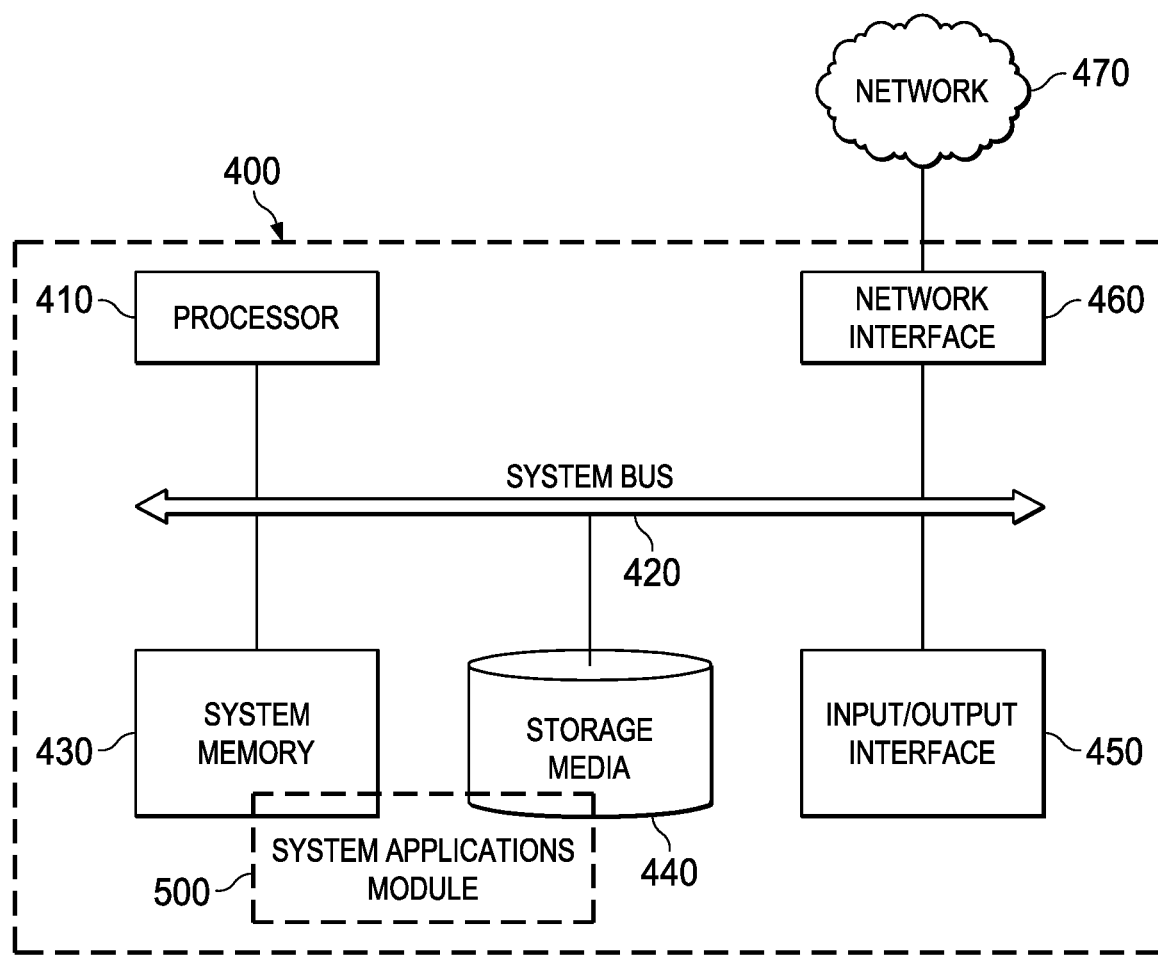
FIG. 9 is a block diagram depicting a computing machine, in accordance with certain example embodiments.

FIG. 9 depicts a computing machine 400 and a system applications module 500 in accordance with example embodiments. The computing machine 400 can correspond to any of the various computers, mobile devices, laptop computers, servers, embedded systems, or computing systems presented herein. The module 500 can comprise one or more hardware or software elements designed to facilitate the computing machine 400 in performing the various methods and processing functions presented herein. The computing machine 400 can include various internal or attached components such as a processor 410, system bus 420, system memory 430, storage media 440, input/output interface 450, and a network interface 460 for communicating with a network 470.

The computing machine 400 can be implemented as a conventional computer system, an embedded controller, a laptop, a server, a mobile device, a smartphone, a wearable computer, a customized machine, any other hardware platform, or any combination or multiplicity thereof. The computing machine 400 can be a distributed system configured to function using multiple computing machines interconnected via a data network or bus system.

The processor 410 can be designed to execute code instructions in order to perform the operations and functionality described herein, manage request flow and address mappings, and to perform calculations and generate commands. The processor 410 can be configured to monitor and control the operation of the components in the computing machine 400. The processor 410 can be a general purpose processor, a processor corer, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 410 can be a single processing unit, multiple processing units, a single processing core, multiple processing cores, special purpose processing cores, co-processors, or any combination thereof. According to certain embodiments, the processor 410 along with other components of the computing machine 400 can be a virtualized computing machine executing within one or more other computing machines.

The system memory 420 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 420 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 420. The system memory 430 can be implemented using a single memory module or multiple memory modules. While the system memory 430 is depicted as being part of the computing machine 400, one skilled in the art will recognize that the system memory 430 can be separate from the computing machine 400 without departing from the scope of the subject technology. It should also be appreciated that the system memory 430 can include, or operate in conjunction with, a non-volatile storage device such as the storage media 440.

The storage media 440 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 440 can store one or more operating systems, application programs and program modules such as module 2050, data, or any other information. The storage media 440 can be part of, or connected to, the computing machine 400. The storage media 440 can also be part of one or more other computing machines that are in communication with the computing machine 400 such as servers, database servers, cloud storage, network attached storage, and so forth.

The system applications module 500 can comprise one or more hardware or software elements configured to facilitate the computing machine 400 with performing the various methods and processing functions presented herein. The module 500 can include one or more sequences of instructions stored as software or firmware in association with the system memory 430, the storage media 440, or both. The storage media 440 can therefore represent examples of machine or computer readable media on which instructions or code can be stored for execution by the processor 410. Machine or computer readable media can generally refer to any medium or media used to provide instructions to the processor 410. Such machine or computer readable media associated with the module 500 can comprise a computer software product. It should be appreciated that a computer software product comprising the module 500 can also be associated with one or more processes or methods for delivering the module 500 to the computing machine 400 via the network 470, any signal-bearing medium, or any other communication or delivery technology. The module 500 can also comprise hardware circuits or information for configuring hardware circuits such as microcode or configuration information for an FPGA or other PLD.

The input/output ("I/O") interface 450 can be configured to couple to one or more external devices, to receive data from the one or more external devices, and to send data to the one or more external devices. Such external devices along with the various internal devices can also be known as peripheral devices. The I/O interface 450 can include both electrical and physical connections for coupling the various peripheral devices to the computing machine 400 or the processor 410. The I/O interface 450 can be configured to communicate data, addresses, and control signals between the peripheral devices, the computing machine 400, or the processor 410. The I/O interface 450 can be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 450 can be configured to implement only one interface or bus technology. Alternatively, the I/O interface 450 can be configured to implement multiple interfaces or bus technologies. The I/O interface 450 can be configured as part of, all of, or to operate in conjunction with, the system bus 420. The I/O interface 450 can include one or more buffers for buffering transmissions between one or more external devices, internal devices, the computing machine 400, or the processor 410.

The I/O interface 450 can couple the computing machine 400 to various input devices including mice, touch-screens, scanners, electronic digitizers, sensors, receivers, touchpads, trackballs, cameras, microphones, keyboards, any other pointing devices, or any combinations thereof. The I/O interface 450 can couple the computing machine 400 to various output devices including video displays, speakers, printers, projectors, tactile feedback devices, automation control, robotic components, actuators, motors, fans, solenoids, valves, pumps, transmitters, signal emitters, lights, and so forth.

The computing machine 400 can operate in a networked environment using logical connections through the network interface 460 to one or more other systems or computing machines across the network 470. The network 470 can include wide area networks (WAN), local area networks (LAN), intranets, the Internet, wireless access networks, wired networks, mobile networks, telephone networks, optical networks, or combinations thereof. The network 470 can be packet switched, circuit switched, of any topology, and can use any communication protocol. Communication links within the network 470 can involve various digital or analog communication media such as fiber optic cables, free-space optics, waveguides, electrical conductors, wireless links, antennas, radio-frequency communications, and so forth.

The processor 410 can be connected to the other elements of the computing machine 400 or the various peripherals discussed herein through the system bus 420. It should be appreciated that the system bus 420 can be within the processor 410, outside the processor 410, or both. According to some embodiments, any of the processor 410, the other elements of the computing machine 400, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A device management system for managing remote device nodes in a network infrastructure comprising:
    a storage resource; and
    a processor communicatively coupled to the storage resource, wherein the processor executes application code instructions that are stored in the storage resource to cause the system to:
       receive a first service request message at a node management system that includes a device identifier and a specific device operation identifier;
       retrieve device type and endpoint information pursuant to the first service request;
       select from a database by the device type an application protocol according to the operation identifier;
       select an operation command file according to the operation identifier;
       send operation commands to a remote device from the node management system; and
       receive a second service request message for the remote device at a device manager, the second service request message including public encryption keys.

2. The device management system of claim 1 wherein the second service request message includes a connection profile identifier that includes a host and domain name, and username and password sets for two or more infrastructure components.

3. The device management system of claim 2 wherein the application code instructions cause the system to retrieve from a database protocol configuration information associated with the first service request for configuring alerts on the remote device.

4. The device management system of claim 3 wherein the application code instructions cause the system to connect to the remote device using a plug-in that provides the protocol configuration information.

5. The device management system of claim 4 wherein the application code instructions cause the system to iterate through device packs and identify the device type and support for in-band and out of band application protocols for the remote device.

6. The device management system of claim 5 wherein the application code instructions cause the system to store the device type, the supported in-band and out of band application protocols, the associated device pack, and the protocol configuration information.

7. The device management system of claim 6 wherein the application code instructions cause the system to receive a third service request message that includes a device identifier of the remote device.

8. The device management system of claim 7 wherein the application code instructions cause the system to iteratively connect to the remote device associated with the device identifier of the remote device using one or more of the supported in-band and out of band application protocols and retrieve an inventory of management operations associated with each of the supported in-band and out of band application protocols.

9. A method of managing remote device nodes in a network infrastructure comprising:
    receiving a first service request message that includes a device identifier and a specific device operation identifier that includes device operation metadata;
    determining a device plugin identifier in response to the first service request message;
    retrieving device type and endpoint information pursuant to the first service request;
    selecting from a database by the device type an application protocol according to the operation identifier;
    selecting an operation command file according to the operation identifier;
    sending to a remote device operation commands generated from the operation command file; and
    receive a second service request message for the remote device at a device manager using the device plugin identifier.

10. The method of claim 9 further comprising receiving a second service request message for the remote device, the request including an address identifier and a connection profile identifier.

11. The method of claim 10 further comprising retrieving from a database protocol configuration information associated with the service request.

12. The method of claim 11 further comprising connecting to the remote device in an application services provider network from a node management system in a management services network using the protocol configuration information.

13. The method of claim 12 further comprising iterating through device packs and identifying the device type and support for in-band and out of band application protocols for the remote device using the node management system.

14. The method of claim 13 further comprising retrieving the device type and identified in-band and out of band application protocols.

15. The method of claim 14 further comprising storing the retrieved device type the in-band and out of band application protocols and the device pack associated with the device type and the in-band and out of band application protocols and the retrieved protocol configuration information.

16. The method of claim 15 further comprising receiving a third service request message that includes a device identifier of the remote device.

17. The method of claim 16 further comprising iteratively connecting to the remote device associated with the device identifier using one or more of the in-band and out of band application protocols and retrieving an inventory of management operations associated with each application protocol.

18. A method of managing remote device nodes in a network infrastructure comprising:

receiving a first service request message from an inventory discovery process of a management services network that includes a device identifier and an operation identifier;

retrieving device type and endpoint information pursuant to the first service request using a device data manager;

selecting an application protocol according to the operation identifier;

selecting an operation command file according to the operation identifier;

sending operation commands generated from the operation command file to a remote device in an application services provider network; and receive a second service request message for the remote device at a device manager using a device plugin identifier.

* * * * *